United States Patent [19]

Lim

[11] 4,323,172

[45] Apr. 6, 1982

[54] LIQUID CONTAINER WITH CUP HOLDER

[76] Inventor: Ho S. Lim, 4109 Metzerott Rd., College Park, Md. 20740

[21] Appl. No.: 114,130

[22] Filed: Jan. 21, 1980

[51] Int. Cl.³ ............................................. B67D 5/62
[52] U.S. Cl. ..................................... 222/130; 220/92
[58] Field of Search ......... 221/96, 221/131; 222/130, 131; 215/6, 13; 15/264; 220/91, 92; 312/43

[56] References Cited

U.S. PATENT DOCUMENTS

| | | | |
|---|---|---|---|
| 930,445 | 8/1909 | Weaver | 220/91 |
| 1,564,529 | 12/1925 | Carter | 312/43 |
| 1,665,179 | 4/1928 | Savage . | |
| 1,778,248 | 10/1930 | Doughty | 222/130 X |
| 2,909,300 | 10/1959 | Engram . | |
| 2,978,132 | 4/1961 | Huck . | |
| 3,262,596 | 7/1966 | Zillmann . | |
| 3,286,884 | 11/1966 | Long, Jr. | 222/131 |
| 3,331,533 | 7/1967 | Krugger . | |
| 3,469,739 | 9/1969 | Phillips . | |
| 3,587,917 | 6/1971 | Triglia . | |

*Primary Examiner*—Stanley H. Tollberg
*Attorney, Agent, or Firm*—A. Fred Starobin

[57] ABSTRACT

A liquid container having a supply of drinking cups nested within the periphery of the jug and accessible by means of a slot in the wall of the container for removal through a top opening differing from the opening through which the liquid is put into the container. Reusable cups may be used without contamination of the liquid.

6 Claims, 4 Drawing Figures

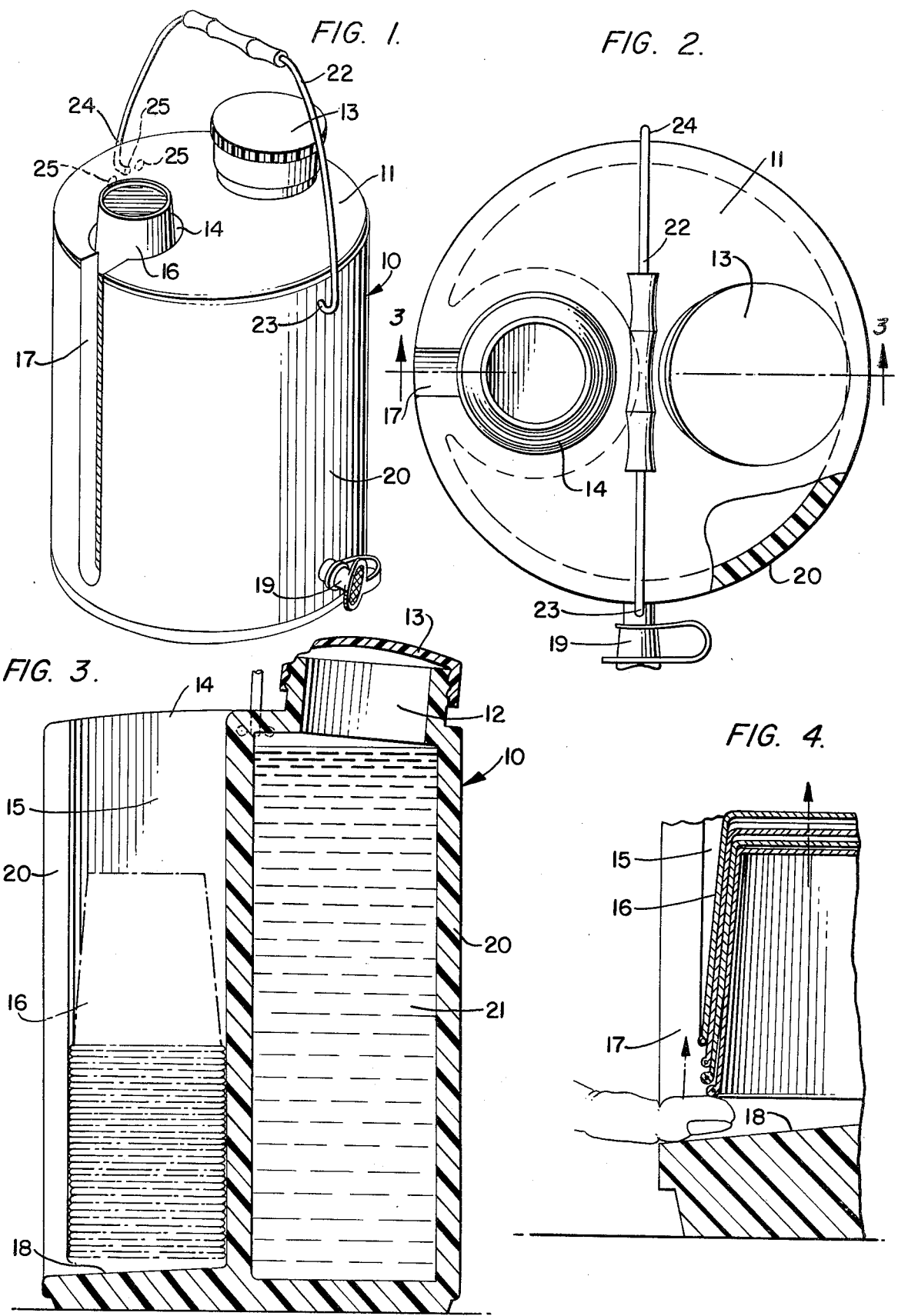

LIQUID CONTAINER WITH CUP HOLDER

BACKGROUND OF THE INVENTION

The present invention relates to liquid containers and more particularly to the type of jug used to carry liquid refreshments on outdoor outings generally in one or two gallon capacity insulated containers.

Such jugs are generally popular on family picnics where they are easily handled, being fairly easy to carry and of sufficient capacity to serve several people.

Since several people are served and each one several times during the course of the outing, it has been considered necessary to also carry along a supply of cups. If the cups are of the disposable type then a large supply may be required during the course of the day during the outing. On the other hand, if not disposable, or not disposed but saved for multiple use, one is subjected to the inconvenience of retaining these where they may be useable by those drinking the liquid from the jug.

Prior patentees have attempted to increase the convenience by having the cups carried with the liquid container.

Engram in U.S. Pat. No. 2,909,300; Huck in U.S. Pat. No. 2,978,132; and Triglia in U.S. Pat. No. 3,587,917 place nested cups under the cap of the jug but in doing so limit the type of cup which can be used and interfere with the filling of the jug. All cups and the insert holding them must first be removed before access for refilling or adding to the contents of the jug is possible. Also opening of the cap allows contamination, i.e. insects everpresent at picnics, of the contents of the liquid in the jug.

Savage in U.S. Pat. No. 1,665,179 and Zillmann in U.S. Pat. No. 3,262,596 have avoided the need to open the jug to obtain use of the cups but still require removal of the cup holder and all cups to obtain entrance to the jug and its liquid contents thus making it somewhat inconvenient to add to the liquid contents from reserve sources.

Phillips in U.S. Pat. No. 3,469,739 avoids the shortcomings mentioned above but with the need to raise the liquid container each time it is desired to obtain a cup, the size of the container is severely limited such as to a carafe as in the Phillips patent. Larger containers such as the one or two gallon, or more, containers which are contemplated with the present invention, would be quite unweldly to use with the structure of Phillips.

SUMMARY OF THE INVENTION

Accordingly, the present invention is directed to a liquid container with a nested supply of drinking cups, which may be reuseable and are easily accessible for use regardless of the size of the container which may be of a larger portable type.

It is a further object of the present invention that the filler opening and cap be unobstructed by the supply of cups to be able to easily add to the contents of the container.

It is a still further object of the present invention to keep the liquid contents uncontaminated during useage by avoiding unnecessary opening of the opening leading to the liquid.

It is another object of the present invention to maintain the balance of the container in relation to the handle attached thereto as the volume of the liquid contents changes during use.

An additional object is to allow for drainage of excess liquid from the nested cups when cups are stored for reuse or it rains on the container as is not unusual during picnic outings.

And another object is to provide for ease of removal of one or more nested cups for use.

Basically the present invention provides for a novel container with a supply of drinking cups nested within the periphery of the container and accessible by means of a slot in the wall.

The present invention further provides for an outwardly sloping surface at the base of the portion holding the nested cups.

The present invention also provides for a handle on the container repositionable on at least one of its ends, preferably on the end connected on the side opposite the pouring spout.

BRIEF DESCRIPTION OF THE DRAWINGS

The above and other objects and advantages of the invention will become apparent upon full consideration of the following detailed description and accompanying drawings in which:

FIG. 1 is a perspective view of the liquid container of the present invention;

FIG. 2 is a top plan view of the container of FIG. 1;

FIG. 3 is a vertical median section along line 3—3 of FIG. 2; and

FIG. 4 is a fragmented slightly enlarged crosssection of a portion of FIG. 3 illustrating cup removal.

DESCRIPTION OF THE PREFRERRED EMBODIMENT

Considering now the details of the embodiment of the invention illustrated in FIGS. 1-4, there is provided an insulated liquid container 10 which may be of a molded styrofoam, a sandwiched insulation between glass lining and plastic or metal, or walls of polyvinyl chloride with or without insulation or dead air space therebetween.

The top portion 11 has an opening 12 which is closed by a screw-on cap 13. The opening 12 leads into the liquid containing portion of the container and should therefore be large enough to allow for the passing of ice cubes for the time when a cold drink is to be carried in the container 10. A second opening 14 in top 11 opens into a well 15 to hold cups 16 in nested position. Well 15 should have a diameter sufficient to accommodate cups to be used. In general a diameter of 3¼ inches has been found to accommodate the largest cups ordinarily used. Well 15 has a downwardly extending slot 17 wide enough for the insertion of a finger, as illustrated in FIG. 4, to remove one or more of the nested cups as needed. The bottom surface 18 of well 15 slopes downward toward the opening of the bottom of slot 17 in order to prevent accumulation of liquid from accidental spills at opening 12 or liquid left in a cup when marked cups for future identification of the user are nested in well 15 for later reuse. Since a use of this container is contemplated for use at outdoor picnics, it is also possible that rain water may fall into the well 15 and is thus removed by sloping surface 18 through the bottom of slot 17.

A spout 19 is mounted near the bottom of container 10 in cylindrical wall 20 connected into the liquid containing portion of container 10 to allow its use and draining of liquid 21 therefrom. A cap or other shutoff means is used with the spout 19 to control pouring of the liquid 21.

A handle 22 is connected at its opposite ends near the top portion 11 of container 10 at substantially diametrically opposite sides of top portion 11. Preferably one end 23 is connected pivotly in cylindrical sidewall 20 directly above spout 19. This allows for ease in tipping container 10 when it is necessary to drain the last bit of liquid 21 from the container 10. The opposite end 24 is pivotly and also adjustably connected to a substantially diametrically opposite side of cylindrical sidewall 20. As illustrated in FIG. 1 the adjustability is obtained by insertion of end 24 in one of holes 25. The handle 22 is held in one of holes 25 due to its spring action. The hole 25 which is chosen to hold end 24 of handle 22 depends upon the volume of liquid remaining in container 10 when container 10 is being carried. Since proportionately more of the liquid is on one side of handle 22 and the lighter cups 16 occupy and with well 15 displace a portion of liquid 21 on the opposite side of the handle 22, the distribution of weight changes with the change of volume of liquid 21. As the liquid 21 decreases in volume the handle end 24 is moved in holes 25 from the side with cap 13 and majority of liquid 21 toward holes 25 nearer the lighter side with well 15 and cups 16. In this manner container 10 can be carried by handle 22 in balanced upright manner whether in a full, half full or empty condition while avoiding an unbalanced leaning of container 10.

This construction accommodates easily to small size containers with fewer cups or large size containers with many cups and to stacks of cups for one time use or cups identified as to the user for reuse by the same person throughout the outing or gathering.

It will be obvious to those skilled in the art that various changes may be made without departing from the scope of the invention and the invention is not to be considered limited to what is shown in the drawings and described in the specification.

I claim:

1. A liquid container for carrying of liquid having a supply of cups therewith comprising
    a walled container having a liquid holding compartment positioned with the center of gravity of liquid therein off-center from the center axis of said walled container.
    a closable opening extending into said liquid holding compartment,
    a well within the periphery of said walled container but outside of said liquid holding compartment for holding the supply of cups in nested relationship,
    a closable spout near the bottom of said walled container connected into said liquid holding compartment,
    carrying means to adjust for changes in the distribution of the weight of the volume of liquid and cups in said container for ease of carrying said container with at least one end of said carrying means being selectively engagable in horizontal positions to said walled container,
    and a downwardly extending finger slot in a wall of said well extending substantially from the top to the bottom of said well.

2. The liquid container of claim 1, further characterized by
    said walled container being cylindrical in overall shape with said well within the periphery of the cylindrical shape.

3. The liquid container of claim 1, further characterized by
    said slot being in the outer wall of said walled container,
    said well having a bottom surface sloping downwardly toward said slot.

4. The liquid container of claim 1, further characterized by
    said carrying means being a handle connected at its ends on opposite sides of said walled container.

5. The liquid container of claim 4, further characterized by
    said handle having one end connected to said walled container at a point above said spout for ease in pouring from said spout.

6. The liquid container of claim 4, further characterized by
    a plurality of holes horizontally arranged in the wall of said container to receive said at least one end of said handle in one of said holes at a time, for adjustment to maintain said container level when supported by said handle regardless of the volume of liquid in said liquid holding compartment and cups in said well.

* * * * *

UNITED STATES PATENT AND TRADEMARK OFFICE
CERTIFICATE OF CORRECTION

PATENT NO.   :   4,323,172
DATED        :   April 6, 1982
INVENTOR(S)  :   Hoshin Lim It is certified that error appears in the above—identified patent and that said Letters Patent is hereby corrected as shown below:

On the title page, Item [76], "Ho S. Lim" should read
--- Hoshin Lim ---.

Signed and Sealed this

Thirteenth Day of July 1982

[SEAL]

Attest:

*Attesting Officer*

GERALD J. MOSSINGHOFF
*Commissioner of Patents and Trademarks*